Jan. 23, 1940.  H. GRIFFIN  2,187,803
MOTION PICTURE APPARATUS
Filed March 4, 1937
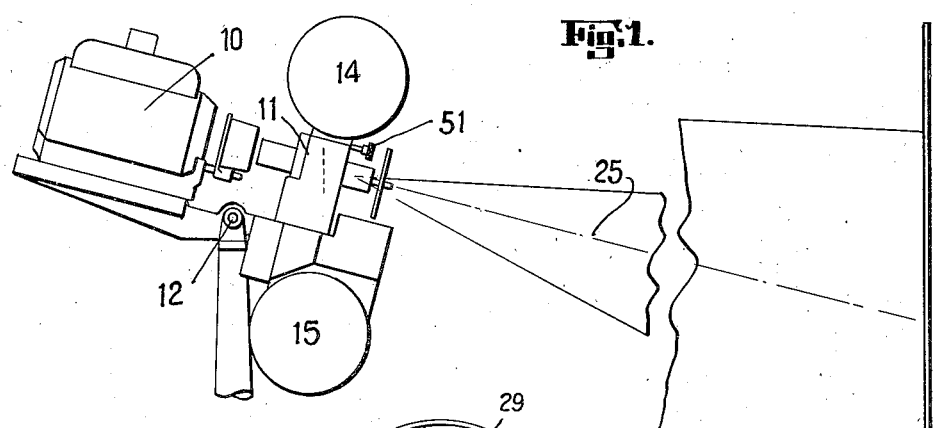
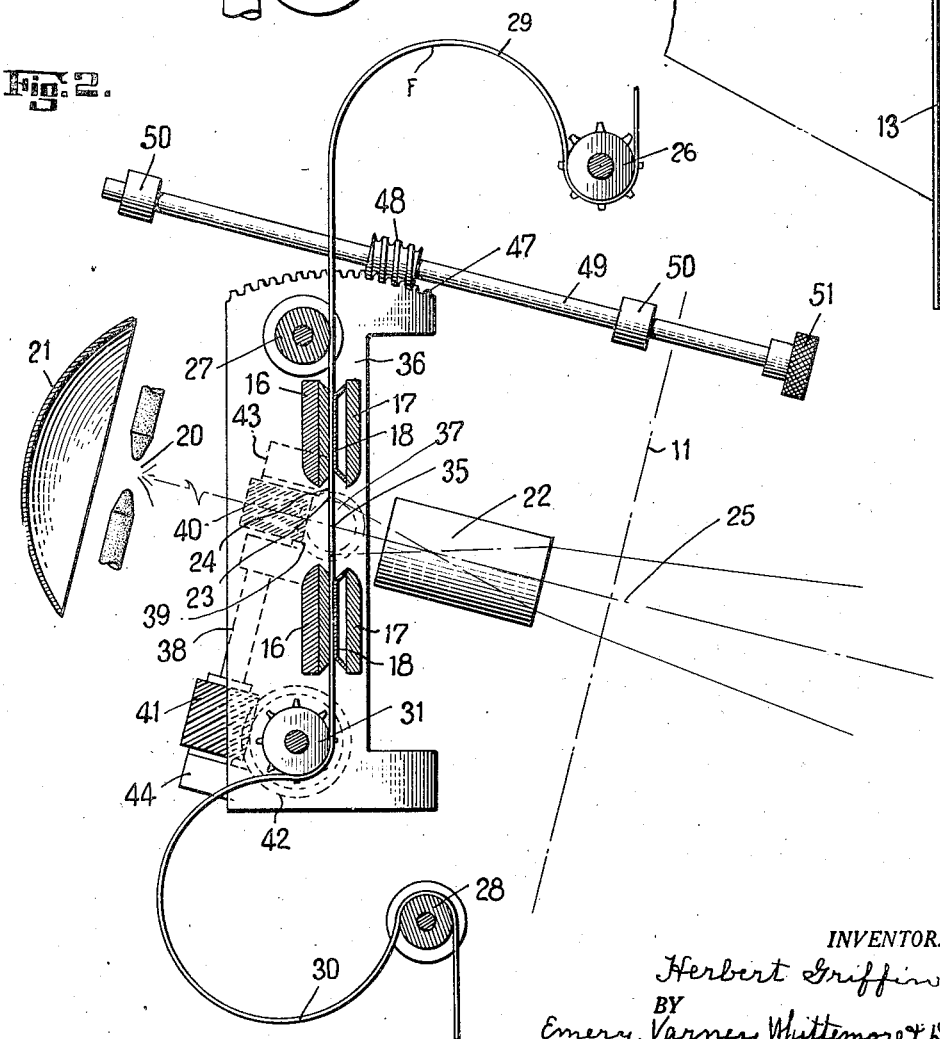
INVENTOR.
Herbert Griffin
BY
Emery, Varney, Whittemore & Dix
ATTORNEYS.

UNITED STATES PATENT OFFICE

2,187,803

MOTION PICTURE APPARATUS

Herbert Griffin, Jersey City, N. J., assignor to International Projector Corporation, New York, N. Y., a corporation of Delaware Application March 4, 1937, Serial No. 128,939

5 Claims. (Cl. 88—24)

This invention relates to motion picture apparatus and has for an object the provision of improvements in this art.

The invention provides for a substantially complete correction of distortion of pictures which are projected along an optical axis on to a screen when the projection machine is positioned above or below the screen. Distortion occurs when the projection machine is positioned at either side of a perpendicular line extending outward horizontally from the center of the screen although not to so great an extent as when the projection machine is positioned quite some distance above the screen. It may be said for information that there is no visible distortion of the projected picture when the projection machine is positioned at substantially the same level as the center of the screen, for the angle of projection in this instance is zero degrees. When the projection machine is positioned above the screen then there may be said to be an angle of projection.

The usual circumstance giving the picture distortion is when the projection machine is positioned quite a distance above the screen. In fact, this condition exists in most commercial motion picture theatres and is the principal condition which requires correction. The horizontal displacement, if any, is usually very small in proportion to the distance from the projection machine to the screen, but the vertical displacement of the projection machine above the screen is usually considerable in proportion to the distance from the projection machine to the screen. Therefore, the distortion of characters and objects in the pictures projected on the screen is correspondingly great. This distortion in practically all instances produces vertically elongated figures out of normal proportion to that of their actual height and size in life. In fact every object in the picture is greatly distorted vertically and slightly distorted horizontally as compared to the picture on the film which was photographed originally for undistorted projection or presentation with a projection angle of about zero degrees.

The magnitude of the distortion practically always increases to the top and to the bottom of the screen from the approximate horizontal center line of the screen which is also the approximate horizontal center plane of the projection beam of light. When the projection machine is positioned above the screen, the distortion below the screen center line is greater than the distortion above the center line and this effect is aggravated by the fact that the lower portion of the screen is usually closer to the spectators than the upper portion.

In addition to the distortion in size, the pictures projected suffer a loss of sharpness of definition above and below the horizontal center line due to the fact that the projection machine is focused upon the center of the screen.

Also, this loss of sharpness of definition may be due to the fact that the full value of the light beam is not being presented to the lenses in a manner that allows the lenses to properly project the light and picture as was originally designed for the machine, and as would be obtained were the angle of projection zero degrees.

This invention also provides for the maximum use of the projected light and lenses and thereby obtains a very great increase in the sharpness of definition of the picture on the screen, even though the projection machine is positioned quite a distance above the screen. Otherwise the lenses are only effecting an average focus instead of a definitely sharp focus which would be the result if the angle of projection were zero degrees.

There have been proposals for correcting the distortion by moving the film at the aperture opening and by moving the aperture plate itself away from their normal positions at right angles to the optical axis and into a position parallel with the screen. The theory underlying these proposals appears to be sound, but the applications of the theory in these proposals have not worked out to give the desired and expected results.

According to one proposal the aperture plate is swung about the center of rotation of the intermittent film-feed sprocket which is below the center of the aperture and the optical axis. This proposal is obviously impractical because the aperture plate is given an absolute bodily movement from or toward the lens; whereas what is actually required is relative movement with its center of rotation centered in the optical axis at the center of the aperture opening. Expressed in another manner, the actual and desired requirement to obtain the desired results of this invention is obtained when the center of rotation of the aperture plate intersects the optical axis in the center of the aperture opening.

According to another proposal the movement is centered correctly in the horizontal axis of the aperture but the lens and the light source as a unit are mounted to turn about the aperture plate. This proposal is impractical because of the increasing complexity and size of modern commercial projection machines. Moreover, there are times and conditions where a fixed aperture plate does not meet the requirements. For one instance, the screen may not always be disposed in a vertical plane and in that case, naturally, the aperture plate would have to be moved.

According to the present invention the aperture plate and film gate mechanism associated therewith are mounted for turning movement about the horizontal axis of the aperture opening and the optical axis intersects this horizontal axis at the center of the aperture opening. This type of construction not only is theoretically correct, but is practical as well. At the same time it furnishes sufficient flexibility of adjustment for all normal conditions of service.

An exemplary embodiment of the invention will now be described, reference being made to the accompanying drawing, wherein:

Fig. 1 is a side elevation of a projection machine embodying the invention; and

Fig. 2 is an enlarged central vertical section of the film gate and related mechanism showing the aperture plate and associated parts.

Referring to the drawing, a projection machine, including a source of light or lamp-house 10 and a projection head 11, is mounted to tilt about a pivot 12 and projects a picture upon a screen 13. The screen may be either vertical or inclined but usually vertical as shown.

In the illustrated example the projection machine is mounted at a considerable height above the screen. The view is foreshortened but anyone familiar with the usual commercial motion picture theatres will recall the relative distances.

Film F is fed from a reel in the upper film magazine 14 to the lower film magazine 15. Intermediately, as shown in Fig. 2, the film is guided through the beam of light by guiding or positioning means including a film trap element 16 and an associated film gate element 17. The gate element is separable from the trap element for threading the film and is provided with spring pressed shoes 18 for resiliently holding the film in position.

The source of light of the lamp-house is indicated in Fig. 2 as an arc 20 with a reflector 21. In front of the film gate element there is a lens or lens assembly 22. The beam of light from the light source passes through the aperture 23 of an aperture plate 24 comprising a part of the film trap element, that is, a part of the film guiding means. The optical axis is indicated by the line 25. The optical axis passes through the center of the aperture 23. The source of light is shown disproportionately close to the aperture plate in Fig. 2 but a jog in the line 25 indicates a greater distance than shown.

The film passes over guide rollers 26, 27, 28 and has the loops 29, 30 formed in it. It is fed by any suitable means such as the intermittent sprocket 31 comprising part of an intermittent feed device.

As explained above, in order to compensate for the distortion caused by having a large angle of projection, means are provided for tilting the aperture plate out of its usual position at right angles to the optical axis. Also, the aperture plate is arranged to tilt about its central horizontal axis which is designated by the numeral 35. The film F should always lie flat against the aperture plate so preferably the film guiding means, including the trap element 16 and the gate element 17, are mounted to tilt with the aperture plate. Most conveniently, the intermittent mechanism, including the sprocket 31, will also tilt with the aperture plate and the film guiding means. This insures a direct pull on the film between the gate element and the feed mechanism.

All of the tiltable parts, including the aperture plate 24, the film element 16, the film gate element 17, the guide roller 27 and the feed mechanism 31, may be carried upon a tiltable frame 36 mounted upon suitable journals to tilt about the axis 35 of the aperture plate. Various means may be employed for driving the intermittent sprocket in all adjusted positions. As one example of suitable driving means, a drive shaft 37 may constitute one pivot or journal of the frame and be operatively connected to the intermittent mechanism as by a short shaft 38 connected with the power shaft 37 by gears 39, 40 and with the intermittent mechanism by the gears 41, 42. The shaft is mounted in suitable bearings 43, 44 provided on the frame 36 so the shaft may swing about the power shaft 37 while constantly maintaining the driving connection to the intermittent mechanism. Any suitable means (not shown) may be provided for compensating for the slight movement which is imparted to the sprocket 31 when it is swung about the axis of the power shaft 37.

Means are provided for tilting the frame 36 and securing it in any desired tilted position. The means herein shown comprises an arcuate rack 47 on the frame 36 and a worm pinion 48 meshing therewith. The pinion is fast on a shaft 49 rotatably supported in fixed bearings 50. The shaft 49 may be rotated by a thumb nut 51. The worm and rack connection makes the adjusting means self-locking, as is obvious.

The angle of projection will vary for different theatres, depending upon the height of the projection machine and its distance from the screen. An average is probably from 15 to 18 degrees. A maximum of 25 degrees may sometimes be permitted but it is very undesirable to try to project pictures where the projection angle is greater than 25 degrees. Consequently the aperture plate tilting mechanism herein disclosed provides for tilting up to about 25 degrees.

In operation, after the projection machine is tilted down until the picture is centered on the screen, the frame 36 carrying the aperture plate and related parts is turned counterclockwise until the aperture is substantially parallel with the screen. This will compensate for the distortion due to the angle of projection. At the same time because the aperture turns about its central axis instead of being moved bodily relative to the lens, the picture on the film will be kept in focus, or as near as is possible in focus under the circumstances. By making the aperture plate adjustable it is possible to obtain a correct setting even when the screen is not disposed vertically.

It is thus seen that the invention provides apparatus for correcting distortion which not only is theoretically correct but is commercially practicable as well. The mechanism is simple and only light parts are required to be tilted so that adjustments may be easily and quickly made. Moreover, no matter what the adjusted position may be or when the adjustments are made, the film feeding mechanism is driven without interruption.

While one embodiment of the invention has been described with particularity in order to illustrate the principles of the invention it is to be understood that the invention itself is not so limited but may be variously embodied within the limits of the prior art and the scope of the subjoined claims.

I claim:

1. Picture projection apparatus, comprising in combination, a source of light, and a projection head mounted for tilting movement as a unit, said head including a lens and means for guiding a film between the source of light and said lens, mounting means for said film guiding means, said film guiding means including an aperture plate provided with an aperture and mounted on said projection head for tilting movement relative to the lens and to the source of light about an axis intersecting the optical axis at the center of the aperture.

2. Picture projection apparatus comprising in combination, a source of light and a projection head mounted for tilting movement as a unit, said head including a lens and means for guiding a film strip in the light beam between said source and said lens, said film guiding means comprising a part provided with a picture framing aperture, and means for tilting said film guiding means relative to said light source and lens substantially on the horizontal central axis of said aperture.

3. Picture projection apparatus, comprising in combination, a source of light and a projection head mounted for tilting movement as a unit, said head including a lens and means for guiding a film strip in the light beam between said source and said lens, said film guiding means comprising a part provided with a picture framing aperture, film feeding means mounted with said film guiding means, and means for tilting said film guiding means relative to said light source and lens substantially on the horizontal central axis of said aperture.

4. Picture projection apparatus, comprising in combination, a source of light and a projection head mounted for tilting movement as a unit, said head including a lens and means for guiding a film strip in the light beam between said source and said lens, said film guiding means comprising a part provided with a picture framing aperture, film feeding means mounted with said film guiding means, means for tilting said film guiding means relative to said light source and lens substantially on the horizontal central axis of said aperture, and means for driving said film feeding means in any position in which it is placed.

5. Picture projection apparatus, comprising in combination, a source of light and a projection head mounted for tilting movement as a unit, said head including a lens and means for guiding a film strip in the light beam between said source and said lens, said film guiding means comprising a part provided with a picture framing aperture, film feeding means mounted with said film guiding means, means for tilting said film guiding means relative to said light source and lens substantially on the horizontal central axis of said aperture, and means for driving said film feeding means in any position in which it is placed, said driving means comprising a power shaft concentric with the axis of tilting and drive connections from said power shaft to said film feeding means.

HERBERT GRIFFIN.